(12) United States Patent
Kuwahara et al.

(10) Patent No.: US 8,854,742 B2
(45) Date of Patent: Oct. 7, 2014

(54) LENS BARREL

(71) Applicant: Panasonic Corporation, Osaka (JP)

(72) Inventors: Takumi Kuwahara, Nara (JP); Tetsuya Uno, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/183,884

(22) Filed: Feb. 19, 2014

(65) Prior Publication Data

US 2014/0168795 A1    Jun. 19, 2014

Related U.S. Application Data

(63) Continuation of application No. 13/159,357, filed on Jun. 13, 2011, now Pat. No. 8,699,148.

(30) Foreign Application Priority Data

Jun. 14, 2010   (JP) ................................. 2010-134771

(51) Int. Cl.
*G02B 15/14* (2006.01)
*G02B 7/04* (2006.01)
*G02B 7/10* (2006.01)

(52) U.S. Cl.
CPC ... *G02B 7/04* (2013.01); *G02B 7/10* (2013.01)
USPC ......................................... 359/700; 359/694

(58) Field of Classification Search
USPC ................................................. 359/694–704
See application file for complete search history.

(56) References Cited

U.S. PATENT DOCUMENTS

| 2006/0045516 | A1 | 3/2006 | Ishizuka et al. | |
|---|---|---|---|---|
| 2006/0061877 | A1 | 3/2006 | Yasui et al. | |
| 2007/0236807 | A1 | 10/2007 | Yasui et al. | |
| 2008/0190241 | A1* | 8/2008 | Kuwahara et al. | 74/838 |
| 2010/0020413 | A1 | 1/2010 | Sato | |
| 2010/0290132 | A1 | 11/2010 | Shinano et al. | |
| 2010/0296176 | A1 | 11/2010 | Shinano et al. | |

FOREIGN PATENT DOCUMENTS

| JP | 62-41114 | 3/1987 |
|---|---|---|
| JP | 07-191252 | 7/1995 |
| JP | 2003-084186 A | 3/2003 |
| JP | 2005-308852 A | 11/2005 |
| JP | 2006-208618 | 8/2006 |

(Continued)

OTHER PUBLICATIONS

Co-pending U.S. Appl. No. 13/159,357, filed Jun. 13, 2011.

*Primary Examiner* — James Jones
(74) *Attorney, Agent, or Firm* — Renner, Otto, Boisselle & Sklar, LLP

(57) ABSTRACT

A lens barrel includes an optical system including a first lens group having at least one lens; a cam frame including a first cam groove; and a first movable frame including a first cam follower engaged with the first cam groove. When the first movable frame relatively rotates with respect to the cam frame, the first movable frame relatively moves with respect to the cam frame in an optical axis direction together with the first lens group. A region of the first cam groove, through which the first cam follower passes when a focal distance of the optical system is changed from a wide-angle end to a tele end includes first and second regions adjacent to each other. The first region has a groove width narrower than that of the second region.

3 Claims, 8 Drawing Sheets

(56) References Cited

FOREIGN PATENT DOCUMENTS

| | | |
|---|---|---|
| JP | 2007-219394 A | 8/2007 |
| JP | 2009-075328 | 4/2009 |
| JP | 2010-008802 | 1/2010 |
| JP | 2010-032970 | 2/2010 |

* cited by examiner

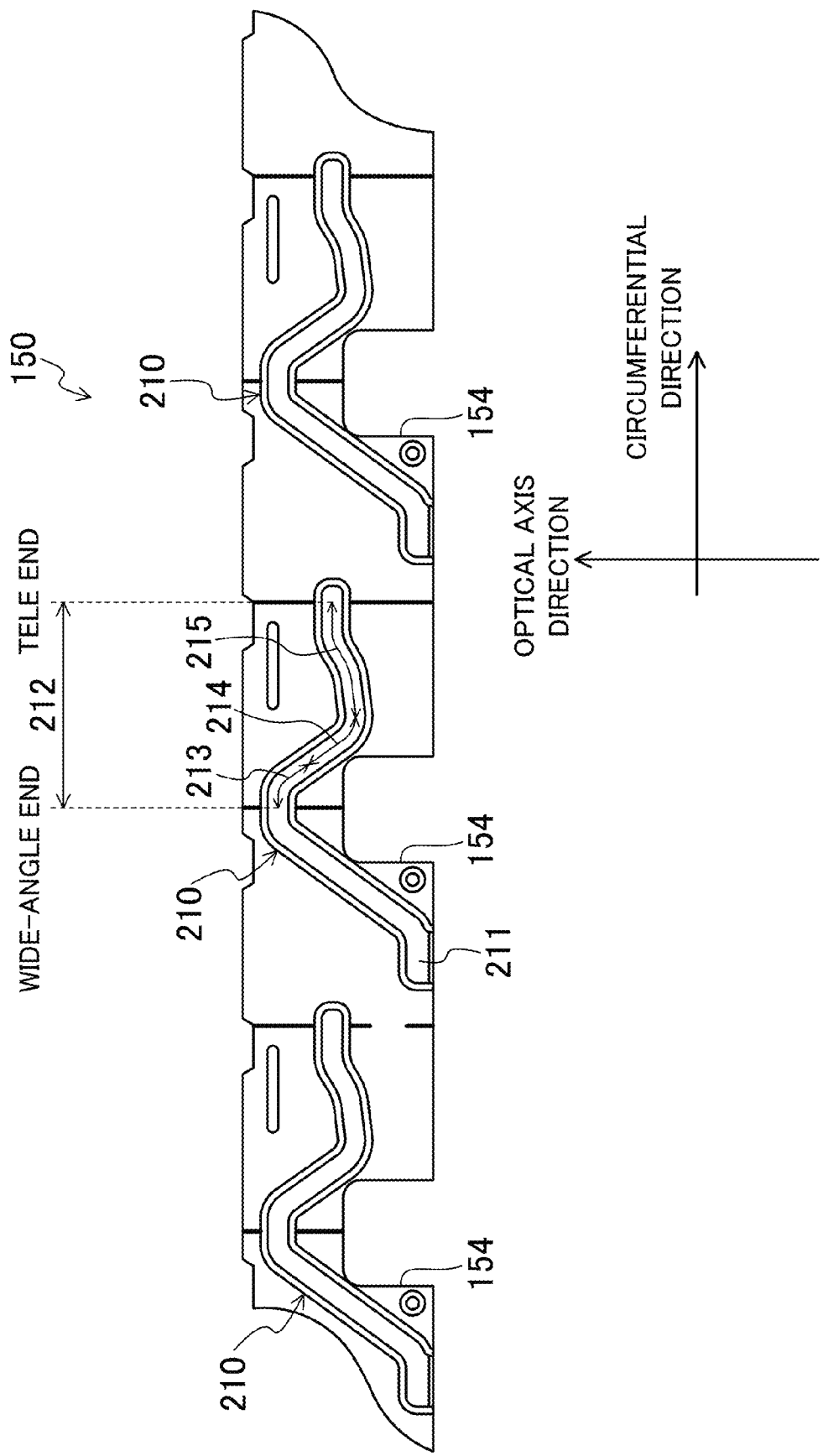

LENS BARREL

CROSS-REFERENCE TO RELATED APPLICATION

This application claims priority to Japanese Patent Application No. 2010-134771 filed on Jun. 14, 2010, the entire disclosure of which is incorporated by reference herein. In addition, this application is related to Japanese Patent Application No. 2011-119595 filed on May 27, 2011, the entire disclosure of which is incorporated by reference herein.

BACKGROUND

A technique disclosed herein relates to a lens barrel including cam mechanisms having cam grooves and cam followers.

Conventionally, a lens barrel has been known, which includes a cam mechanism having a cam groove and a cam follower, and in which a position of a lens is adjustable. As one of the lens barrels of this type, there is a lens barrel disclosed in Japanese Patent Publication No. 2006-208618. The lens barrel includes a first group frame holding a first lens group, and a drive frame driving the first group frame. A first group cam follower is provided on an outer circumferential surface of the first group frame. On the other hand, a first group cam groove to be engaged with the first group cam follower is formed in an inner circumferential surface of the drive frame. The first group frame is housed in the drive frame. In such a state, the first group cam follower is engaged with the first group cam groove.

Another groove is formed in the drive frame other than the first group cam groove. Specifically, the lens barrel further includes a second group frame holding a second lens group in addition to the first group frame. A second group cam follower is provided on an outer circumferential surface of the second group frame. A second group cam groove to be engaged with the second group cam follower is formed in the drive frame. The second group frame is housed in the drive frame, and the second group cam follower is engaged with the second group cam groove. Three first group cam grooves and three second group cam grooves are provided.

SUMMARY

However, in a configuration in which a plurality of types of grooves are formed, a portion where the cam groove and the another groove are close to each other is formed. There is a possibility that, when a cam follower is exactly positioned in the portion of the cam groove close to the another groove, if a lens barrel receives an impact due to, e.g., dropping of the lens barrel etc., a wall separating the cam groove and the another wall is damaged.

The technique disclosed herein has been made in view of the foregoing, and an objective of the technique is to provide a lens barrel resistant to an impact.

A lens barrel disclosed herein includes an optical system including a first lens group having at least one lens; a cam frame including a first cam groove; and a first movable frame including a first cam follower engaged with the first cam groove. When the first movable frame relatively rotates with respect to the cam frame, the first movable frame relatively moves with respect to the cam frame in an optical axis direction together with the first lens group. A region of the first cam groove, through which the first cam follower passes when a focal distance of the optical system is changed from a wide-angle end to a tele end includes first and second regions adjacent to each other. The first region has a groove width narrower than that of the second region.

According to the technique disclosed herein, the lens barrel resistant to the impact can be provided.

BRIEF DESCRIPTION OF THE DRAWINGS

FIG. 9 is a development view of an inner circumferential surface of a cam frame of other embodiment.

DETAILED DESCRIPTION

Figure 1:
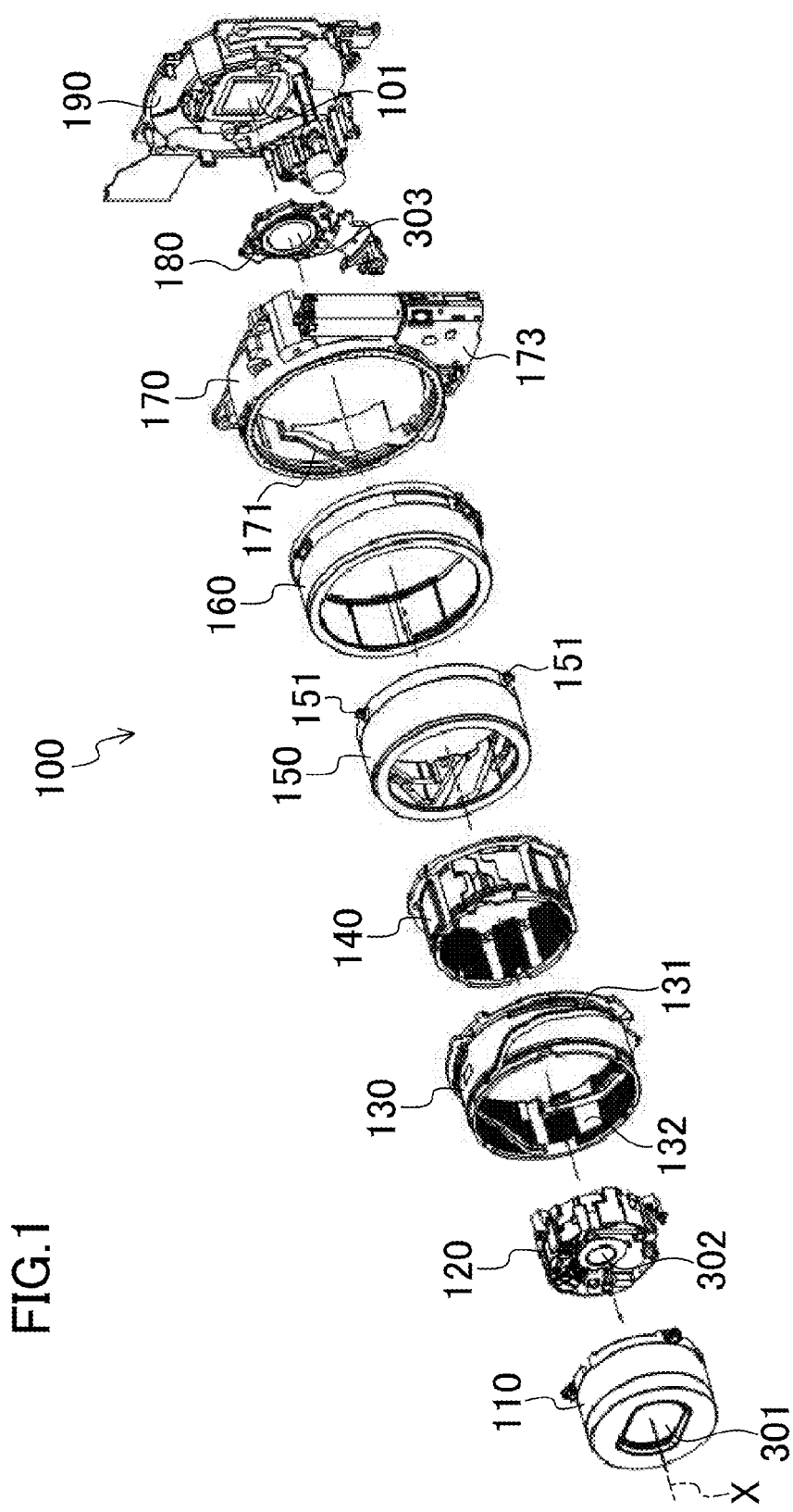
FIG. 1 is an exploded perspective view of a lens barrel of an embodiment.

An example embodiment will be described below in detail with reference to the drawings. FIG. 1 is an exploded perspective view of a lens barrel of an example embodiment.

A lens barrel 100 of the present embodiment is mounted in a digital still camera. The lens barrel 100 includes a master flange 190, various frames which will be described below, an optical imaging system formed by lenses held by the frames, and an imaging device 101 configured to convert light entering the imaging device 101 through the optical imaging system into an electrical signal and output the electrical signal. The lens barrel 100 is one example, and can be mounted not only in the digital still camera but also in a camcorder, a camera-equipped cell-phone, etc. The optical imaging system includes a first lens group 301, a second lens group 302, and a focus lens group 303. Each of the first lens group 301, the second lens group 302, and the focus lens group 303 includes one or more lenses. The optical imaging system forms an optical image of an object on a light receiving surface of the imaging device 101. The first lens group 301 forms a first lens group, and the second lens group 302 forms a second lens group.

As the various frames, the lens barrel 100 includes a first group frame 110 holding the first lens group 301, a second group frame 120 holding the second lens group 302, a cam slot frame 130, a translational frame 140, a cam frame 150, a drive frame 160, a fixed frame 170, and a third group frame 180 holding the focus lens group 303. The first group frame 110, the second group frame 120, the cam slot frame 130, the translational frame 140, the cam frame 150, the drive frame 160, the fixed frame 170, and the third group frame 180 are concentrically arranged about an optical axis X.

The imaging device 101 is fixed to the master flange 190. In addition, the fixed frame 170 is fixed to the master flange 190. A cam groove 171 extending in a predetermined pattern and having a bottom, and a translational groove extending in an optical axis direction (or a direction of the optical axis X) and having a bottom are formed in an inner circumferential surface of the fixed frame 170. A zoom motor unit 173 is attached to the fixed frame 170. In the present specification, unless otherwise described, a "groove" includes a groove having a bottom and a groove not having a bottom. In addition, unless otherwise described, a "slot" means a groove not having a bottom.

A drive cam follower and a gear portion are provided on an outer circumferential surface of the drive frame 160. The drive frame 160 is housed in the fixed frame 170. In such a state, the drive cam follower of the drive frame 160 is engaged with the cam groove 171 of the fixed frame 170, and the gear portion of the drive frame 160 is engaged with the zoom motor unit 173. The drive frame 160 is rotatably driven about the optical axis by the zoom motor unit 173. The drive frame 160 relatively moves in the optical axis direction while rotating about the optical axis with respect to the fixed frame 170 according to the cam groove 171. A circumferential groove extending in a circumferential direction and having a bottom, and a translational groove extending in the optical axis direction and having a bottom are formed in an inner circumferential surface of the drive frame 160.

A first engagement protrusion to be engaged with the translational groove of the fixed frame 170, and a second engagement protrusion to be engaged with the circumferential groove of the drive frame 160 are provided on an outer circumferential surface of the cam slot frame 130. The cam slot frame 130 is housed in the drive frame 160. In such a state, the second engagement protrusion of the cam slot frame 130 is engaged with the circumferential groove of the drive frame 160. This allows the cam slot frame 130 to relatively rotate about the optical axis with respect to the drive frame 160, and not to relatively move in the optical axis direction with respect to the drive frame 160. That is, the cam slot frame 130 moves together with the drive frame 160 in the optical axis direction. The cam slot frame 130 housed in the drive frame 160 is further housed in the fixed frame 170. In such a state, the first engagement protrusion is engaged with the translational groove of the fixed frame 170. Since the translational groove of the fixed frame 170 extends in the optical axis direction, the cam slot frame 130 is supported so as to move in the optical axis direction in a state in which the cam slot frame 130 cannot relatively rotate with respect to the fixed frame 170. A cam slot 131 extending in a predetermined pattern is formed in the cam slot frame 130. In addition, a translational groove 132 extending in the optical axis direction and having a bottom is formed in an inner circumferential surface of the cam slot frame 130.

Cam followers 151 are provided on an outer circumferential surface of the cam frame 150. The cam frame 150 is housed in the cam slot frame 130. In such a state, the cam followers 151 of the cam frame 150 penetrate the cam slot 131 of the cam slot frame 130, and are engaged with the translational groove of the drive frame 160. In this manner, the cam frame 150 is held so as to rotate together with the drive frame 160 and translationally and relatively move in the optical axis direction with respect to the drive frame 160. In addition, the cam followers 151 are also engaged with the cam slot 131 of the cam slot frame 130. Thus, when the drive frame 160 is rotatably driven, the cam frame 150 relatively move in the optical axis direction while relatively rotating with respect to the cam slot frame 130 according to a shape of the cam slot 131. First group cam grooves 210 each having a bottom and second group cam grooves 220 each having a bottom are provided in an inner circumferential surface of the cam frame 150. In addition, engagement protrusions are provided on the inner circumferential surface of the cam frame 150.

The translational frame 140 is housed in the cam frame 150. A circumferential groove extending in the circumferential direction and having a bottom is formed in an outer circumferential surface of the translational frame 140. The engagement protrusions of the cam frame 150 are engaged with the circumferential groove. The engagement of the engagement protrusions with the circumferential groove allows the translational frame 140 to relatively rotate with respect to the cam frame 150, and not to relatively move in the optical axis direction with respect to the cam frame 150. That is, while the cam frame 150 moves in the optical axis direction and rotates, the translational frame 140 moves together with the cam frame 150 in the optical axis direction. The translational frame 140 includes engagement protrusions outwardly protruding from a rear end portion of the translational frame 140. The rear end portion of the translational frame 140 protrudes beyond the cam frame 150, and the engagement protrusion is engaged with the translational groove 132 of the cam slot frame 130. The engagement of the engagement protrusion with the translational groove 132 allows the translational frame 140 not to relatively rotate with respect to the cam slot frame 130. In addition, translational slots are formed in the translational frame 140.

The first group frame 110 includes first group cam followers 111. The first group frame 110 is housed in the translational frame 140. The first group frame 110 is engaged with the translational slots of the translational frame 140. The first group frame 110 is translationally and relatively movable in the optical axis direction with respect to the translational frame 140, and does not relatively rotate with respect to the translational frame 140. The first group cam followers 111 are engaged with the first group cam grooves 210 of the cam frame 150. When the cam frame 150 rotates, the first group frame 110 relatively moves in the optical axis direction with respect to the cam frame 150 and relatively rotates with respect to the cam frame 150 through a first cam mechanism formed by the first group cam follower 111 and the first group cam groove 210. The first group frame 110 forms a first movable frame, and the first group cam follower 111 forms a first cam follower.

The second group frame 120 includes second group cam followers 121. The second group frame 120 is housed in the translational frame 140. The second group frame 120 is engaged with the translational slot of the translational frame 140. The second group frame 120 is translationally and relatively movable in the optical axis direction with respect to the translational frame 140, and does not relatively rotate with respect to the translational frame 140. The second group cam followers 121 are engaged with the second group cam grooves 220 of the cam frame 150. When the cam frame 150 rotates, the second group frame 120 relatively moves in the optical axis direction with respect to the cam frame 150 and relatively rotates with respect to the cam frame 150 through a second cam mechanism formed by the second group cam follower 121 and the second group cam groove 220. The second group frame 120 forms a second movable frame, and the second group cam follower 121 forms a second cam follower.

The third group frame 180 is slidably engaged with a guide pole provided in the master flange 190. The third group frame 180 is driven separately from other frames in the optical axis direction by an actuator provided in the master flange 190.

The cam groove 171 of the fixed frame 170, the cam slot 131 of the cam slot frame 130, and the first group cam groove 210 and the second group cam groove 220 of the cam frame 150 are set so as to have a proper shape corresponding to a rotational angle. Thus, the first lens group 301 and the second lens group 302 can be arranged in proper positions depending on a rotation amount of the drive frame 160. In addition, the length of the lens barrel 100 in the optical axis direction when the lens barrel 100 is not in a shootable state (i.e., in a retracted state) can be shortened.

In the lens barrel 100 configured as described above, when the zoom motor unit 173 rotatably drives the drive frame 160, the first group frame 110 and the second group frame 120 move in the optical axis direction. This adjusts a focal distance of the optical imaging system. In addition to the foregoing, the third group frame 180 is moved to a proper position based on a distance between the object and the lens barrel 100. In such a manner, light enters the imaging device 101 to form an image on the imaging device 101, and such an image is captured.

Figure 2:
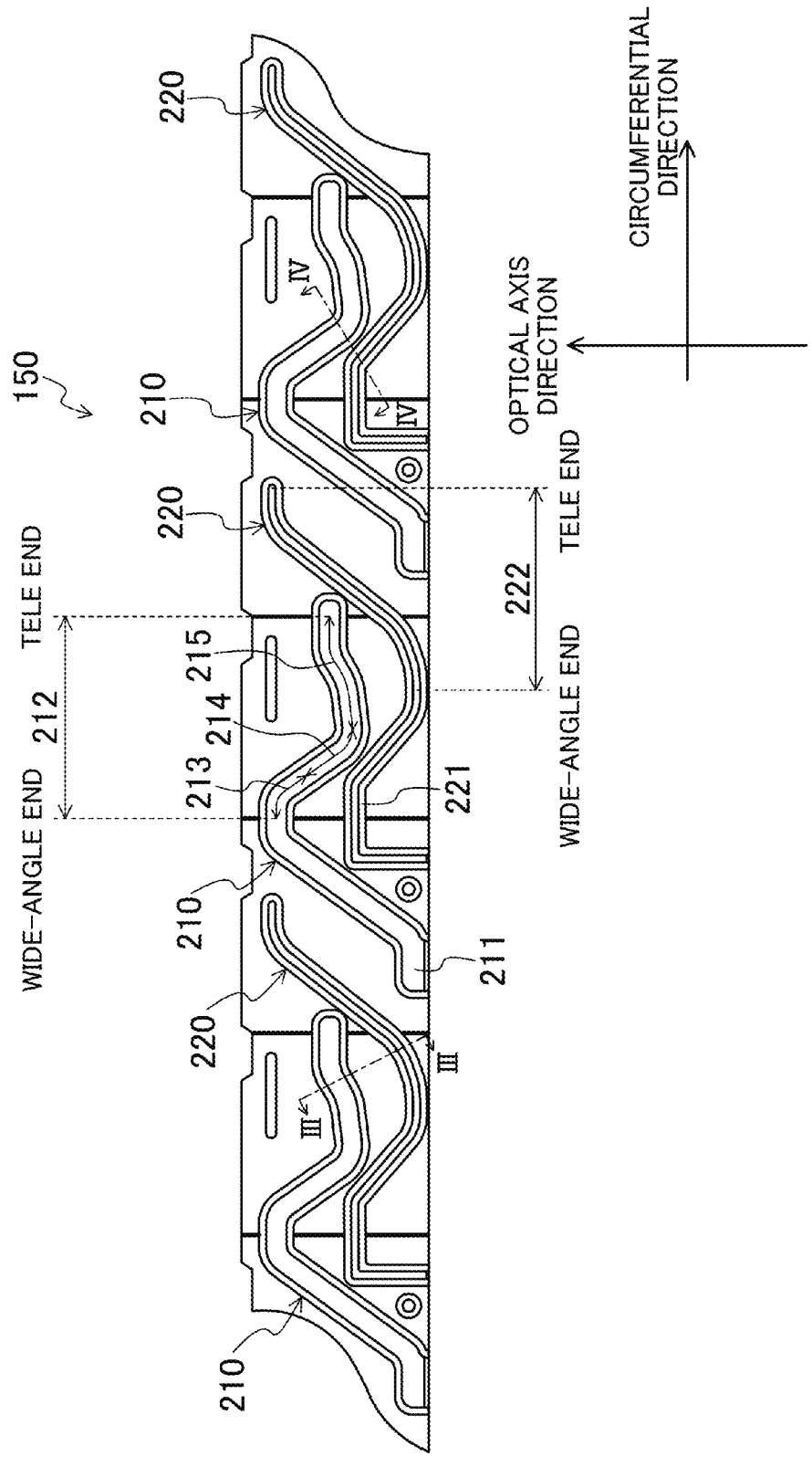
FIG. 2 is a development view of an inner circumferential surface of a cam frame.
Figure 3:
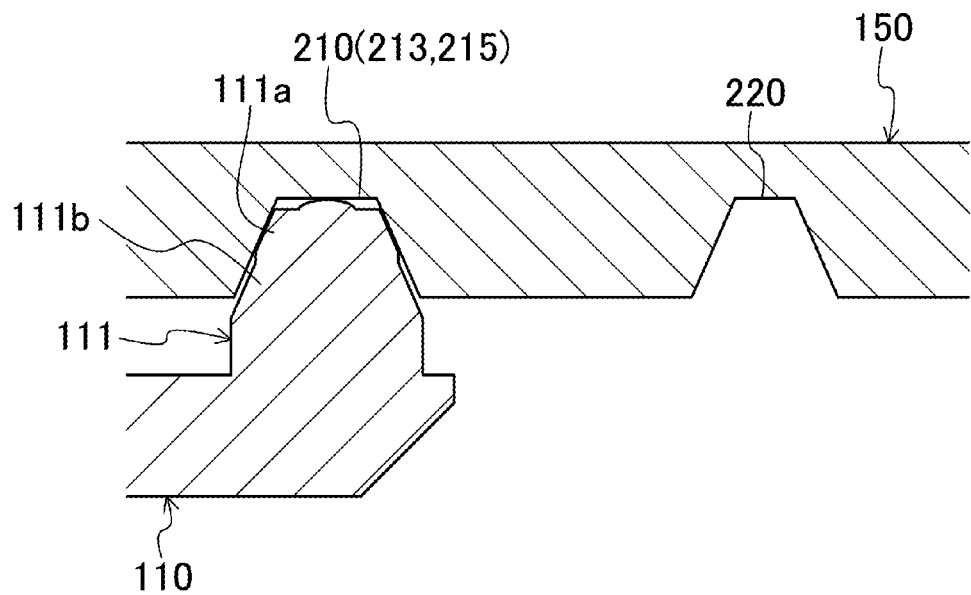
FIG. 3 is an III-III cross-sectional view of first and second group cam grooves of FIG. 2.
Figure 4:
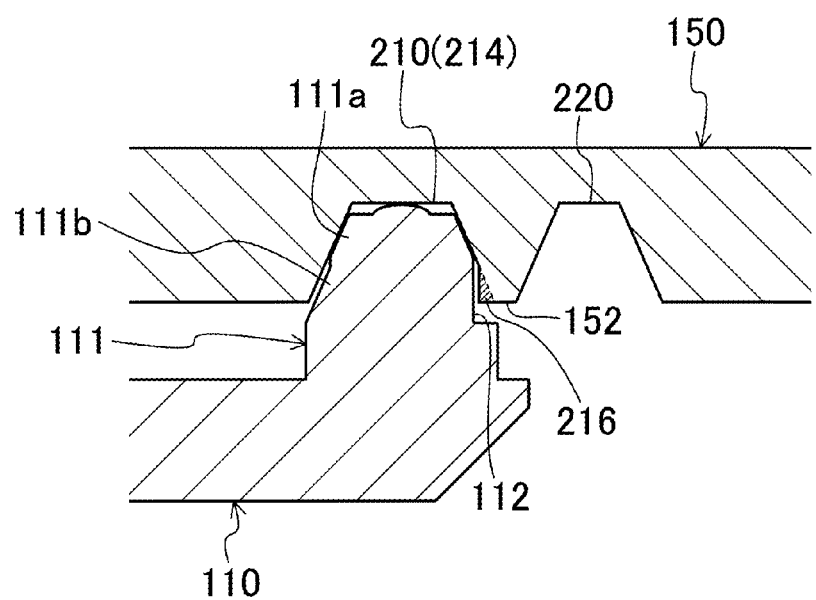
FIG. 4 is an IV-IV cross-sectional view of the first and second group cam grooves of FIG. 2.
Figure 5:
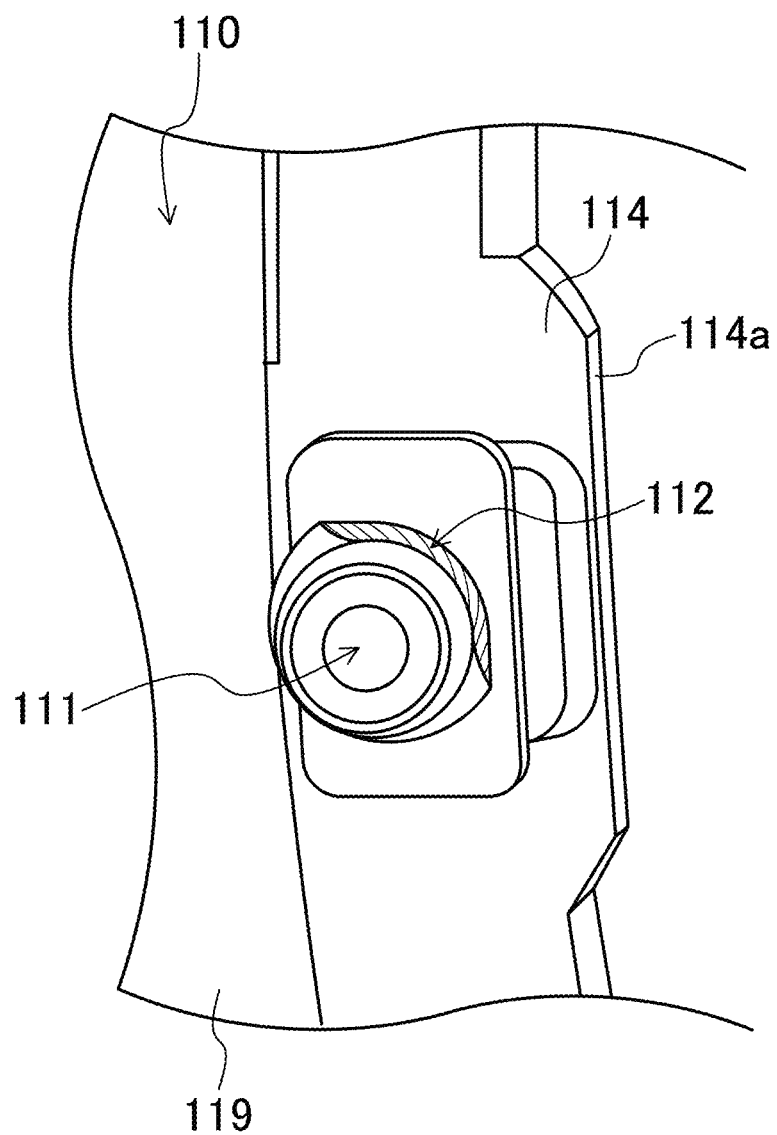
FIG. 5 is a perspective view of a first cam follower.

Subsequently, a configuration of the cam frame 150 and the first group cam follower 111 will be described in detail. FIG. 2 is a development view of the inner circumferential surface of the cam frame 150. In FIG. 2, the "optical axis direction" means a direction parallel to the optical axis of the optical imaging system, and the "circumferential direction" means a circumferential direction about the optical axis. FIG. 3 is an III-III cross-sectional view of the first group cam groove 210 and the second group cam groove 220 of FIG. 2, and FIG. 4 is an IV-IV cross-sectional view of the first group cam groove 210 and the second group cam groove 220 of FIG. 2. FIGS. 3 and 4 are the cross-sectional views at a plane perpendicular to an axis line direction of the first group cam groove 210 (i.e., a direction in which the first group cam groove 210 extends). Note that the first group cam follower 111 is also illustrated in FIGS. 3 and 4. FIG. 5 is a perspective view of the first group cam follower 111.

The cam frame 150 is made of resin such as polycarbonate etc. For example, the cam frame 150 is molded with a mold. Note that the cam frame 150 may be made of material other than resin (e.g., metal).

Three first group cam grooves 210 and three second group cam grooves 220 are formed in the inner circumferential surface of the cam frame 150. Both of the first group cam groove 210 and the second group cam groove 220 are grooves with bottoms. The first group cam grooves 210 form first cam grooves, and the second group cam grooves 220 form second cam grooves, i.e., second grooves. Note that at least one of the first group cam groove 210 and the second group cam groove 220 may be a through-groove (i.e., a groove which does not have the bottom). Alternatively, at least one of the first group cam groove 210 and the second group cam groove 220 may be formed in the outer circumferential surface of the cam frame 150.

The first group cam groove 210 includes a retracted region 211 and a shootable region 212. One of end portions of the shootable region 212 near the retracted region 211 is a wide-angle end, and the other end portion apart from the retracted region 211 is a tele end.

As in the first group cam groove 210, the second group cam groove 220 includes a retracted region 221 and a shootable region 222. One of end portions of the shootable region 222 near the refracted region 221 is a wide-angle end, and the other end portion apart from the retracted region 221 is a tele end.

When the first and second group cam followers 111, 121 pass through regions of the first and second group cam grooves 210, 220 parallel to the circumferential direction, respectively, the first and second group frames 110, 120 do not relatively move in the optical axis direction with respect to the cam frame 150. On the other hand, when the first and second group cam followers 111, 121 pass through regions of the first and second group cam grooves 210, 220, which are inclined to the circumferential direction, the first and second group frames 110, 120 relatively move in the optical axis direction with respect to the cam frame 150.

When the lens barrel 100 is in a non-shooting state (e.g., the lens barrel 100 is turned "OFF"), the first and second group cam followers 111, 121 are positioned in the retracted regions 211, 221, respectively. At this point, the lens barrel 100 is in the retracted state, and a dimension of the lens barrel 100 in the optical axis direction is the minimum. When the lens barrel 100 is turned "ON" from "OFF," the zoom motor unit 173 is operated, and the first and second group cam followers 111, 121 are moved to the wide-angle ends of the shootable regions 212, 222, respectively. When shooting, the zoom motor unit 173 drives the first and second group frames 110, 120, and the first and second group cam followers 111, 121 move in the shootable regions 212, 222 of the first and second group cam grooves 210, 220, respectively. In such a manner, a focal position of the optical imaging system is adjusted.

The first group cam groove 210 and the second group cam groove 220 are provided adjacent to each other. Thus, the first group cam groove 210 has a portion close to the second group cam groove 220 and a portion apart from the second group cam groove 220. Specifically, the first group cam groove 210 includes a first distant region 213 which is relatively apart from the second group cam groove 220, a close region 214 which is relatively close to the second group cam groove 220, and a second distant region 215 which is relatively apart from the second group cam groove 220 in the shootable region 212 in this order from the wide-angle end to the tele end. The close region 214 corresponds to a first region, and the first and second distant regions 213, 215 correspond to second regions.

A shape in a cross section of the close region 214 of the first group cam groove 210 is different from a shape in a cross section of the first and second distant regions 213, 215 of the first group cam groove 210. Specifically, the first group cam groove 210 in the first and second distant regions 213, 215 has a tapered shape in which a groove width (a dimension in a direction perpendicular to both of an axis line direction and a depth direction of the groove) is gradually and monotonously reduced toward the bottom. In such a state, inclination angles of both side surfaces of the first group cam groove 210 are substantially the same.

On the other hand, a portion of the first group cam groove 210 near its bottom in the close region 214 has a tapered shape in which the inclination angles of the both side surfaces of the first group cam groove 210 are substantially the same, and has a shape similar to that of portions of the first group cam groove 210 near the bottom in the first and second distant regions 213, 215. However, in an opening end portion of the first group cam groove 210 (i.e., a portion near an inner circumferential surface of the cam frame 150) in the close region 214, a protrusion 216 protruding toward an inside of the first group cam groove 210 is provided in one of the two side surfaces of the first group cam groove 210 closer to the second group cam groove 220. The side surface of the first group cam groove 210 in the protrusion 216 is not an inclined surface but a surface parallel to the groove depth direction.

As in the foregoing, the groove width of the first group cam groove 210 in the close region 214 (in particular, the groove width of the opening end portion) is narrower than the groove width of the first group cam groove 210 in the first and second distant regions 213, 215. In the first group cam follower 111, a notch 112 is formed corresponding to the groove width of the first group cam groove 210.

Specifically, the first group cam follower 111 is substantially formed in a tapered shape in which the first group cam follower 111 gradually becomes thinner toward its tip end. An inclination angle and a width of a tip end portion 111a of the first group cam follower 111 are substantially the same as those of the portion of the first group cam groove 210 near the bottom of the first group cam groove 210. The tip end portion 111a of the first group cam follower 111 is fitted into the portion of the first group cam groove 210 near the bottom of the first group cam groove 210 in a state in which the tip end of the first group cam follower 111 contacts the bottom of the first group cam groove 210. Technically, a clearance which allows the first group cam follower 111 to smoothly slide in the first group cam groove 210 is provided between the tip end portion 111a of the first group cam follower 111 and each of the side surfaces of the portion of the first group cam groove 210 near the bottom of the first group cam groove 210. On the other hand, a base end portion 111b of the first group cam follower 111 has a tapered shape, but a diameter of the base end portion 111b is reduced in a stepwise manner. Thus, a clearance between the base end portion 111b of the first group cam follower 111 and each of the side surfaces of the opening end portion of the first group cam groove 210 is larger than the clearance between the tip end portion 111a of the first group cam follower 111 and each of the side surfaces of the portion of the first group cam groove 210 near the bottom of the first group cam groove 210. The notch 112 is formed in a portion of the base end portion 111b of the first group cam follower 111, which faces the protrusion 216 while the first group cam follower 111 passes through the first group cam groove 210. That is, the base end portion 111b of the first group cam follower 111 is partially cut out in a circumferential surface so that a thickness of the first group cam follower 111 is reduced. That is, a dimension of the base end portion 111b of the first group cam follower 111 in a width direction of the close region 214 of the first group cam groove 210 (i.e., a width in the direction perpendicular to both of the axis line direction and the depth direction of the first group cam groove 210) is smaller than a dimension in the width direction of the first and second distant regions 213, 215 of the first group cam groove 210.

This allows the first group cam follower 111 to smoothly pass through the first group cam groove 210 even in a configuration in which the width of the first group cam groove 210 is partially narrowed.

Since the protrusion 216 is provided as in the foregoing, a thickness of a wall 152 separating the first group cam groove 210 and the second group cam groove 220 can be increased in the portion where the first group cam groove 210 and the second group cam groove 220 are close to each other. In a case where the protrusion 216 is not provided, the wall 152 between the first group cam groove 210 and the second group cam groove 220 is thin, and there is a possibility that the wall 152 between the first group cam groove 210 and the second group cam groove 220 is damaged or deformed if an impact is applied to the lens barrel 100 due to, e.g., dropping of the digital still camera etc. while the first group cam follower 111 is exactly positioned in the close region 214 of the first group cam groove 210. On the other hand, in a case where the protrusion 216 is provided in the first group cam groove 210, the thickness of the wall 152 can be increased by a thickness of the protrusion 216 (a shaded portion illustrated in the figure). This improves strength of the wall 152.

Figure 6:
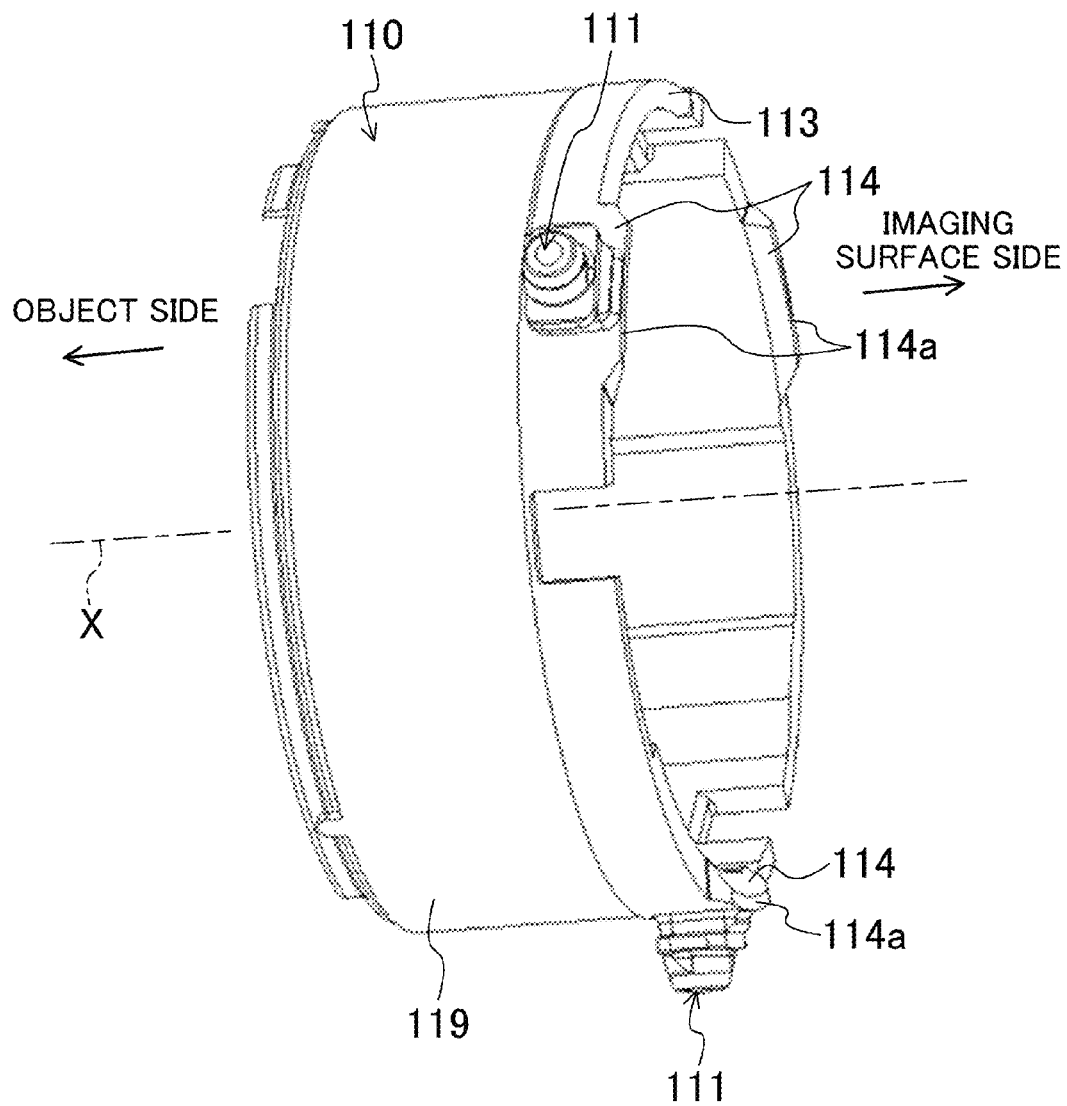
FIG. 6 is a perspective view of a first group frame.
Figure 7:
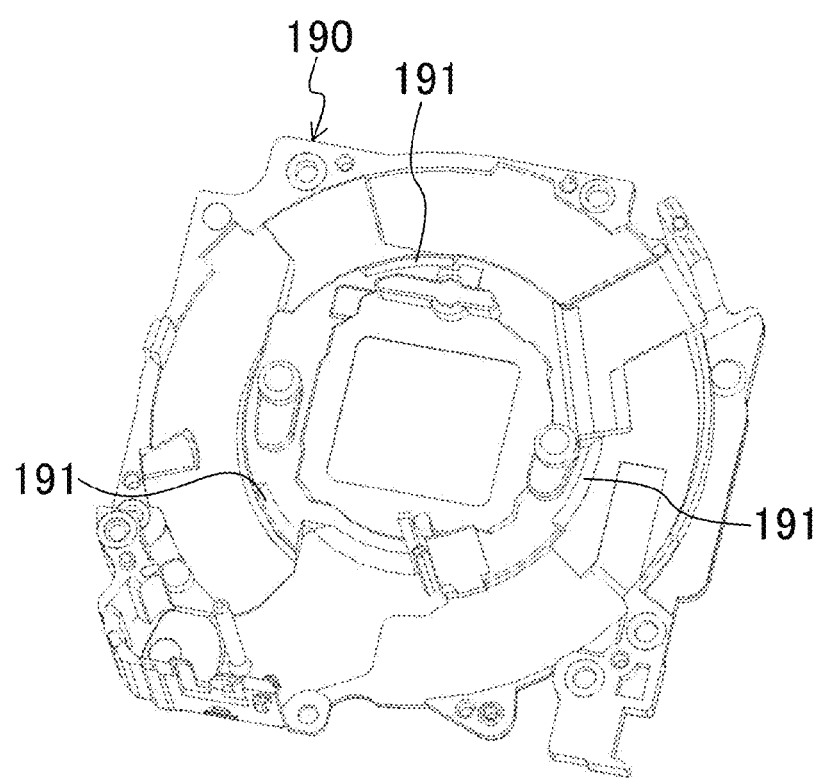
FIG. 7 is a perspective view of a master flange.
Figure 8:
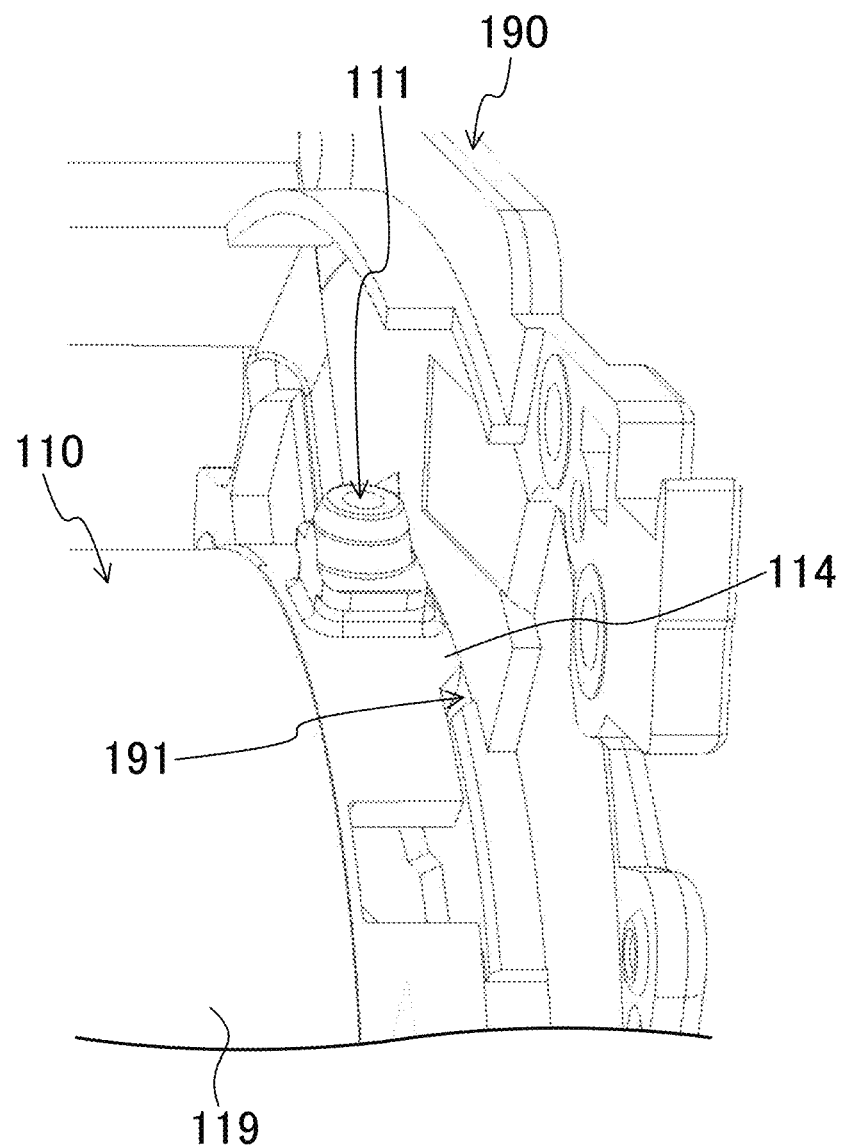
FIG. 8 is an enlarged partial view of the first group frame and the master flange in a retracted state.

Subsequently, the first group frame 110 and the master flange 190 will be described in more detail. FIG. 6 is a perspective view of the first group frame 110. FIG. 7 is a perspective view of the master flange 190. FIG. 8 is an enlarged partial view of the first group frame 110 and the master flange 190 in the retracted state.

The first group frame 110 includes a tubular cylinder 119 extending in the optical axis direction, and the first group cam followers 111 provided on an outer circumferential surface of the cylinder 119. The first group frame 110 is made of resin. The cylinder 119 and the first group cam followers 111 are integrally formed. In an imaging-surface-side end portion of the outer circumferential surface of the cam frame 150 in the optical axis direction, the first group cam followers 111 are provided at three point spaced at intervals in the circumferential direction.

In portions of an imaging-surface-side end surface 113 of the cylinder 119 in the optical axis direction, which correspond to the first group cam followers 111, three protrusions 114 protruding toward the imaging surface in the optical axis direction are provided. Positions of the first group cam followers 111 and positions of the protrusions 114 are coincident with each other. In other words, the protrusions 114 are provided on the imaging surface side in the optical axis direction relative to the first group cam followers 111.

The protrusions 114 can reduce a risk of causing damage of the first group cam followers 111. That is, when the impact is applied to the lens barrel 100 due to, e.g., the dropping of the lens barrel 100 etc., such an impact is also applied to the first group cam followers 111. Since the first group cam followers 111 are provided in the end portion of the cylinder 119 in the optical axis direction, it is likely that the first group cam followers 111 are damaged together with a wall portion of the cylinder 119 when the impact is applied. On the other hand, the protrusions 114 are provided, and therefore the end portion of the cylinder 119 in the optical axis direction, in which the first group cam followers 111 are provided can be expanded toward the imaging surface in the optical axis direction. This allows the first group cam followers 111 to be substantially in positions apart from the end surface 113 of the cylinder 119 in the optical axis direction. As a result, strength of the portion of the cylinder 119, in which the first group cam followers 111 are provided is improved. Such a configuration reduces the risk of causing the damage of the first group cam followers 111.

Recessed portions 191 into which the protrusions 114 of the first group frame 110 are fitted when the lens barrel 100 is in the retracted state are formed in the master flange 190. It is preferred that, in the retracted state, a size of the lens barrel 100 is set as small as possible. However, a dimension of the first group frame 110 in the optical axis direction is increased due to the protrusions 114. Thus, the formation of the recessed portions 191 in the master flange 190 allows compact retraction of the first group frame 110 in the retracted state even in a configuration in which the protrusions 114 are provided. That is, the dimension of the lens barrel 100 in the optical axis direction in the retracted state can be reduced. Note that the master flange 190 is not entirely thinned, but only portions of the master flange 190 corresponding to the protrusions 114 are recessed in order to receive the protrusions 114. Thus, strength of the master flange 190 can be maintained.

In the retracted state, an end surface 114a of each of the protrusions 114 in the optical axis direction contacts a bottom surface of each of the recessed portions 191. This reduces an inclination of the first group frame 110 to the optical axis X in the retracted state. In addition, a dimension of the protrusion 114 can be increased to the bottom of the master flange 190. This expands the protrusion 114, thereby further reducing the risk of causing the damage of the first group cam followers 111.

Thus, the lens barrel (100) of the present embodiment includes an optical system (optical imaging system) including a first lens group (first lens group 301) having at least one lens; a cam frame (150) including a first cam groove (first group cam groove 210); and a first movable frame (first group frame 110) including a first cam follower (first group cam follower 111) engaged with the first cam groove. When the first movable frame relatively rotates with respect to the cam frame, the first movable frame relatively moves with respect to the cam frame in an optical axis direction together with the first lens group. A region of the first cam groove, through which the first cam follower passes when a focal distance of the optical system is changed from a wide-angle end to a tele end (shootable region 212) includes first and second regions (close region 214, and first and second distant regions 213, 215) adjacent to each other. The first region has a groove width narrower than that of the second region.

The cam frame includes a second groove (second group cam groove 220) other than the first cam groove.

The first region includes a portion closer to the second groove than any portions of the second region.

The lens barrel 100 further includes a second movable frame (second group frame 120) including a second cam follower (second group cam follower 121). The optical system further includes a second lens group (second lens group 302) having at least one lens. The second groove is a second cam groove (second group cam groove 220) engaged with the second cam follower. When the second movable frame relatively rotates with respect to the cam frame, the second movable frame relatively moves with respect to the cam frame in the optical axis direction together with the second lens group.

In the first region, one of side surfaces of the first cam groove closer to the second groove protrudes toward an inside of the first cam groove.

A dimension of the first cam follower in a width direction of the first region of the first cam groove is smaller than that in a width direction of the second region.

A width of an opening-end-side portion of the first region is narrower than that of the second region, and a width of a bottom portion of the first region is the same as that of the second region. In a portion (base end portion 111b) of the first cam follower corresponding to the opening-end-side portion of the first cam groove, the dimension of the first cam follower in the width direction of the first region is smaller than that of the second region. In a portion (tip end portion 111a) of the first cam follower corresponding to the bottom portion of the first cam groove, the dimension of the first cam follower in the width direction of the first region is the same as that of the second region.

The lens barrel (100) of the present embodiment includes a cam frame (cam frame 150) having a cam groove (first group cam groove 210); and a movable frame (first group frame 110) having a cam follower (first group cam follower 111) engaged with the cam frame. The cam follower is provided in an end portion of an outer or inner circumferential surface of the movable frame in an optical axis direction. A protrusion (114) protruding in the optical axis direction is provided in an end surface (113) of a portion of the movable frame in the optical axis direction, in which the cam follower is provided.

The lens barrel further includes a master flange (190). In the master flange, a recessed portion (191) is formed, into which the protrusion is fitted when the movable frame is in a retracted state.

The protrusion contacts a bottom of the recessed portion when the movable frame is in the retracted state.

According to the foregoing configuration, the wall 152 in the portion where the first group cam groove 210 and the second group cam groove 220 are close to each other can be reinforced, and the lens barrel 100 can be resistant to the impact.

The portion of the first group frame 110, in which the first group cam followers 111 are provided is reinforced, and therefore it is unlikely to damage the first group cam followers 111. In this regard, the lens barrel 100 can be also resistant to the impact.

The wall 152 between the first group cam groove 210 and the second group cam groove 220 is a portion contacting the first group cam follower 111 of the first group frame 110. The first group frame 110 is the frame positioned closest to the object in the lens barrel 100, and is most susceptible to the impact caused due to, e.g., the dropping of the lens barrel 100 etc. That is, by reinforcing the wall 152, the lens barrel 100 can be effectively reinforced. Note that the wall between two grooves or the wall between the groove and the notch, which contacts the cam follower provided in the frame other than the first group frame 110 may be reinforced in the similar manner to the foregoing configuration.

Other Embodiment

The present disclosure may have the following configurations in the foregoing embodiment.

In the foregoing embodiment, the width of the first group cam groove 210 of the cam frame 150 has been described, but the present disclosure is not limited to the first group cam groove 210. That is, as long as the cam groove is engaged with the cam follower, the similar configuration may be employed in a member other than the cam frame 150.

The shape of the first group cam groove 210 is not limited to the shape described in the foregoing embodiment. That is, the first group cam groove 210 is the groove formed in the tapered shape. However, the side surfaces of the first group cam groove 210 may extend parallel to the groove depth direction, or only one of the side surfaces of the first group cam groove 210 may extend parallel to the groove depth direction. In addition, the first group cam groove 210 is the groove having the bottom, but may be a through-groove such as a slit.

The shape of the protrusion 216 of the first group cam groove 210 is not limited to the shape described in the foregoing embodiment. For example, a step may be formed between the protrusion 216 and a side wall of the first group cam groove 210. The protrusion 216 may not be provided across an entire region of the close region 214 of the first group cam groove 210, or may be provided in the first distant region 213 and/or the second distant region 215 beyond the close region 214. That is, as long as a portion of the close region 214 of the first group cam groove 210, in which its width is the minimum is smaller in width than a portion of the first or second distant region 213, 215 of the first group cam groove 210, in which its width is the maximum, any shapes can be employed for the protrusion 216.

The first and second distant regions 213, 215 are provided in the first group cam groove 210, but either one of the first and second distant regions 213, 215 may be provided in the first group cam groove 210. The close region 214 and the first and second distant regions 213, 215 cam be arranged in any positions depending on the shape of the first group cam groove 210 and the second group cam groove 220. That is, as long as a portion of the close region 214 of the first group cam groove 210, which is the closest to the second group cam groove 220 is closer to the second group cam groove 220 as compared to any portions of the first or second distant region 213, 215 of the first group cam groove 210, the close region which is the first region and the distant region which is the second region can be freely provided.

A member close to the first group cam groove 210 in the close region 214 is the second group cam groove 220 in the foregoing embodiment, but the present disclosure is not limited to such a configuration. For example, the member close to the first group cam groove 210 is not the cam groove, but may be an engagement groove for restricting a movement of other members (e.g., for anti-rotation). Alternatively, as illustrated in FIG. 9, the member close to the first group cam groove 210 may be a notch 154 provided in the cam frame. In such a case, the close region 214 of the first group cam groove 210 includes a portion of the shootable region 212 of the first group cam groove 210, which is the closest to the notch 154. There is a case where the notch 154 is provided for the purposes of, e.g., avoiding a contact with other members etc. because of size reduction of a lens barrel. Even in such a case, the risk of causing the damage due to the impact can be reduced.

The second group cam groove 220 is not limited to the foregoing configuration. For example, the second group cam groove 220 may be a through-groove.

In the foregoing configuration, the protrusion 216 is provided in the first group cam groove 210 to reinforce the wall 152 between the first group cam groove 210 and the second group cam groove 220, but the present disclosure is not limited to such a configuration. For example, the similar protrusion may be provided in the second group cam groove 220. In such a case, in the close region including a portion of the shootable region 222 of the second group cam groove 220 close to the first group cam groove 210, a protrusion protruding toward an inside of the second group cam groove 220 is provided in one of side surfaces of the second group cam groove 220 closer to the first group cam groove 210. Further, in the second group cam follower 121, a notch similar to the notch 112 of the first group cam follower 111 is provided.

The first group cam follower 111 is not limited to the foregoing configuration. For example, the notch 112 is provided in the section of the first group cam follower 111 in the circumferential direction, but may be provided along an entire circumference of the first group cam follower 111. However, it is preferred in terms of strength of the first group cam follower 111 that the notch 112 is provided only a portion of the first group cam follower 111, which faces the protrusion 216. In addition, the first group cam follower 111 includes a step formed by the tip end portion 111a and the base end portion 111b, but may not include such a step. Further, the first group cam follower 111 is in the tapered shape similar to that of the first group cam groove 210, but any shapes can be employed as long as the first group cam follower 111 is engaged with the first group cam groove 210.

The first group cam groove 210 is provided in the inner circumferential surface of the cam frame 150, but the present disclosure is not limited to such a configuration. The first group cam groove 210 may be provided in the outer circumferential surface of the cam frame 150. In such a case, the first cam follower is engaged with the first group cam groove 210 from an outside of the cam frame 150.

As described above, the present disclosure is useful for the lens barrel including the cam mechanisms having the cam grooves and the cam followers.

The description of the embodiments of the present disclosure is given above for the understanding of the present disclosure. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A lens barrel comprising:
a master flange provided at one end of the lens barrel in an optical axis direction;
a cam frame including a cam groove; and
a movable frame including a tubular cylinder extending in the optical axis direction and a cam follower engaged with the cam groove, moving relative to the master flange in the optical axis direction and spaced apart from the master flange at least when shooting,
wherein the cam follower is provided in an end portion of an outer or inner circumferential surface of the tubular cylinder in the optical axis direction,
a protrusion protruding in the optical axis direction is provided on an end surface of a portion of the tubular cylinder in the optical axis direction, in which the cam follower is provided, and
a contact portion contacting the master flange in a retracted state of the movable frame is formed with the protrusion of the movable frame.

2. The lens barrel of claim 1,
wherein, in a portion of the master flange corresponding to the protrusion in the retracted state of the movable frame, a recessed portion is formed, into which the protrusion enters when the movable frame is in the retracted state.

3. The lens barrel of claim 1, wherein
a portion of the cam follower in a circumferential direction thereof is thinner than the other portion of the cam follower.

* * * * *